(12) United States Patent
Zhao et al.

(10) Patent No.: US 10,282,120 B2
(45) Date of Patent: May 7, 2019

(54) METHOD, APPARATUS AND SYSTEM FOR INSERTING DISK

(71) Applicant: BEIJING BAIDU NETCOM SCIENCE AND TECHNOLOGY CO., LTD., Beijing (CN)

(72) Inventors: Rui Zhao, Beijing (CN); Yu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 68 days.

(21) Appl. No.: 15/722,850

(22) Filed: Oct. 2, 2017

(65) Prior Publication Data

US 2018/0188990 A1 Jul. 5, 2018

(30) Foreign Application Priority Data

Jan. 3, 2017 (CN) .......................... 2017 1 0003232

(51) Int. Cl.
*G06F 3/06* (2006.01)
(52) U.S. Cl.
CPC .......... *G06F 3/0632* (2013.01); *G06F 3/0604* (2013.01); *G06F 3/067* (2013.01); *G06F 3/0683* (2013.01)

(58) Field of Classification Search
None
See application file for complete search history.

(56) References Cited

U.S. PATENT DOCUMENTS

| 8,122,263 B2 * | 2/2012 | Leichsenring | .......... G06F 21/51 |
| | | | 713/194 |
| 8,185,684 B1 * | 5/2012 | Naftel | ................. G06F 9/45558 |
| | | | 711/173 |
| 2007/0276833 A1 * | 11/2007 | Sen | ......................... G06F 16/22 |

* cited by examiner

*Primary Examiner* — Denise Tran
(74) *Attorney, Agent, or Firm* — Seed IP Law Group LLP

(57) ABSTRACT

The present disclosure discloses a method and apparatus for inserting a disk. The method comprises: detecting whether a to-be-inserted disk has a drive letter identifier, wherein the drive letter identifier is acquired by a server through: acquiring a universally unique identifier of the disk; querying a correspondence between the universally unique identifier and a device name, acquiring the device name of the disk, analyzing the device name of the disk to generate a drive letter value of the disk, and generating a drive letter identifier for the disk; acquiring the drive letter value in response to detecting the disk identifier; determining whether the device name associated with the drive letter value is allocated to a different disk; and defining the device name of the disk based on the drive letter value so as to insert the disk if the device name is not allocated to the different disk.

17 Claims, 6 Drawing Sheets

METHOD, APPARATUS AND SYSTEM FOR INSERTING DISK

CROSS-REFERENCE TO RELATED APPLICATION

This application is related to and claims priority from Chinese Application No. 201710003232.6, filed on Jan. 3, 2017 and entitled "Method, Apparatus and System for Inserting Disk", the entire disclosure of which is hereby incorporated by reference.

TECHNICAL FIELD

The present disclosure relates to the field of computer, in particular to the field of virtual machine, and especially to a method, apparatus and system for inserting a disk.

BACKGROUND

As a complete computer system that has complete hardware system functions and runs in a completely isolated environment may be simulated by means of software, virtual machines are widely used in the computer field because of the advantages such as less hardware resource occupation. When a virtual machine such as a QEMU-KVM (quick emulator-kernel-based virtual machine) is used, the device names of the disks are named in a hexavigesimal positional numeral system based on the 26 English letters (such as vda, vdb ... vdz, vdaa, vdab ...), and the first unoccupied device name is generally allocated to each disk when the disk is created or inserted. If the virtual machine dynamically creates and deletes multiple disks, the drive letters may drift, that is, another device name is allocated to a disk to which a device name has been allocated when the disk is used again, where the creation and deletion order is not based on the same corresponding relationship (for example, the previously created disks have been subject to hot swap operation etc.).

The existing methods for solving the drive letter drift problem usually include: limiting the number of disks to less than or equal to 2, distinguishing the disk types, distinguishing the disk sizes, and creating and deleting disks in strict accordance with the disk usage order. Some of these methods limit the number of disks, some of them limit the size of disk, and some of them limit disk usage order, and lack convenience. The disadvantage of the prior art is that the effectiveness of solving the disk drift by limiting the use process is not high.

SUMMARY

A purpose of the present disclosure is to provide an improved method and apparatus for inserting a disk so as to solve the technical problems as mentioned in the background.

In a first aspect, the present disclosure provides a method for inserting a disk, comprising: detecting whether a to-be-inserted disk has a drive letter identifier, wherein the drive letter identifier is acquired by a server through: acquiring a universally unique identifier of the disk, querying a correspondence between the universally unique identifier of the disk and a device name, the correspondence between the universally unique identifier of the disk and an allocated device name being established when a device name is first allocated to each disk, acquiring the device name of the disk in response to successful querying the correspondence between the universally unique identifier of the disk and the allocated device name, analyzing the device name of the disk to generate a drive letter value of the disk, and generating a drive letter identifier for the disk; acquiring the drive letter value in response to detecting the disk identifier; determining whether the device name associated with the drive letter value is allocated to a different disk; and defining the device name of the disk based on the drive letter value so as to insert the disk if the device name is not allocated to the different disk.

In some embodiments, the method also comprises: defining the device name of the disk based on an unoccupied device name so as to insert the disk in response to not detecting the drive letter identifier.

In some embodiments, the defining the device name of the disk based on an unoccupied device name so as to insert the disk comprises: sequentially detecting whether a value on each bit in an allocation bit map is a preset value, wherein the allocation bit map is used to record an occupancy status of a device name associated with each drive letter value at a present time, and a value on a bit corresponding to an occupied drive letter value of an associated device name is set as the preset value; and defining the device name, associated with the detected drive letter value corresponding to a first bit having a value not set as the preset value, as the device name of the disk so as to insert the disk.

In some embodiments, the drive letter identifier comprises a preset value on a predetermined flag bit.

In some embodiments, the determining whether the device name associated with the drive letter value is allocated to a different disk comprises: determining whether a value on a bit corresponding to the drive letter value in an allocation bit map for device name is a preset value, wherein the allocation bit map is used to record an occupancy status of the device name associated with each drive letter value at a present time, and a value on a bit corresponding to the occupied drive letter value of the associated device name is set as the preset value; if yes, determining that the device name associated with the drive letter value is allocated to a different disk; otherwise, determining that the device name associated with the drive letter value is not allocated to the different disk.

In some embodiments, the method also comprises: designating the disk as failed to insert if an extracted drive letter value has been allocated to a different disk.

In a second aspect, the present disclosure also provides a method for inserting a disk, comprising: acquiring a universally unique identifier of a to-be-inserted disk; querying a correspondence between the universally unique identifier of the disk and a device name according to the universally unique identifier of the disk, wherein the correspondence between the universally unique identifier of the disk and an allocated device name is established when a device name is first allocated to each disk; acquiring the device name of the disk in response to successful querying the correspondence between the universally unique identifier of the disk and the allocated device name; analyzing the device name of the disk to generate a drive letter value of the disk, and generating a drive letter identifier for the disk, so that a virtual machine detects the drive letter identifier, acquires the driver value in response to detecting the disk identifier, determines whether the device name associated with the drive letter value is allocated to a different disk, and defines the device name of the disk based on the drive letter value so as to insert the disk if the device name is not allocated to the different disk.

In some embodiments, the method for first allocating a device name to each disk comprises: detecting whether the device name is assigned to the disk to be allocated; and if yes, allocating the assigned device name to the disk to be allocated, if no, allocating a first unallocated device name to the disk to be allocated in a naming order of device names.

In a third aspect, the present disclosure provides an apparatus for inserting a disk, comprising: a detection module, configured to detect whether a to-be-inserted disk has a drive letter identifier, wherein the drive letter identifier is acquired by a server through: acquiring a universally unique identifier of the disk, querying a correspondence between the universally unique identifier of the disk and a device name, wherein the correspondence between the universally unique identifier of the disk and an allocated device name being established when a device name is first allocated to each disk; acquiring the device name of the disk in response to successful querying the correspondence between the universally unique identifier of the disk and the allocated device name, analyzing the device name of the disk to generate a drive letter value of the disk, and generating a drive letter identifier for the disk; an acquisition module, configured to acquire the drive letter value in response to detecting the disk identifier; a determination module, configured to determine whether the device name associated with the drive letter value is allocated to a different disk; and a defining module, configured to define the device name of the disk based on the drive letter value so as to insert the disk if the device name is not allocated to the different disk.

In some embodiments, the apparatus also comprises a compatible module, configured to define the device name of the disk based on an unoccupied device name so as to insert the disk in response to not detecting the drive letter identifier.

In some embodiments, the compatible module comprises: a detection unit, configured to sequentially detect whether a value on each bit in an allocation bit map is a preset value, wherein the allocation bit map is used to record an occupancy status of a device name associated with each drive letter value at a present time, and a value on a bit corresponding to an occupied drive letter value of an associated device name is set as the preset value; and a defining unit, configured to define the device name, associated with the detected drive letter value corresponding to a first bit having a value not set as the preset value, as the device name of the disk so as to insert the disk.

In some embodiments, the drive letter identifier comprises a preset value on a predetermined flag bit.

In some embodiments, the determination module is further configured to: determine whether a value on a bit corresponding to the drive letter value in an allocation bit map for device name is a preset value, wherein the allocation bit map is used to record an occupancy status of the device name associated with each drive letter value at a present time, and a value on a bit corresponding to the occupied drive letter value of the associated device name is set as the preset value; if yes, determining that the device name associated with the drive letter value is allocated to a different disk; otherwise, determining that the device name associated with the drive letter value is not allocated to the different disk.

In some embodiments, the apparatus also comprises an error reporting module, configured to designate the disk as failed to insert if an extracted drive letter value has been allocated to a different disk.

In a fourth aspect, the present disclosure also provides an apparatus for inserting a disk, comprising: an acquisition module, configured to acquire a universally unique identifier of a to-be-inserted disk; a query module, configured to query a correspondence between the universally unique identifier of the disk and a device name according to the universally unique identifier of the disk, wherein the correspondence between the universally unique identifier of the disk and an allocated device name is established when a device name is first allocated to each disk; a transfer module, configured to acquire the device name of the disk in response to successful querying the correspondence between the universally unique identifier of the disk and the allocated device name; a generation module, configured to analyze the device name of the disk to generate a drive letter value of the disk, and generating a drive letter identifier for the disk, so that a virtual machine detects the drive letter identifier, acquires the driver value in response to detecting the disk identifier, determines whether the device name associated with the drive letter value is allocated to a different disk, and defines the device name of the disk based on the drive letter value so as to insert the disk if the device name is not allocated to the different disk.

In some embodiments, the apparatus also comprises a detection module that includes: a detection unit, configured to detect whether the device name is assigned to the disk; and an allocation unit, configured to allocate the assigned device name to the disk if the device name is assigned to the disk, if no, allocating a first unallocated device name to the disk in a naming order of device names.

In a fifth aspect, the present disclosure also provides a system for inserting a disk, comprising a server for managing a virtual machine and a terminal capable of running the virtual machine, wherein the server is configured to: acquire a universally unique identifier of a to-be-inserted disk; query a correspondence between the universally unique identifier of the disk and a device name according to the universally unique identifier of the disk, wherein the correspondence between the universally unique identifier of the disk and an allocated device name is established when a device name is first allocated to each disk; acquire the device name of the disk in response to successful querying the correspondence between the universally unique identifier of the disk and the allocated device name; analyze the device name of the disk to generate a drive letter value of the disk, and generate a drive letter identifier for the disk; and the virtual machine running on the terminal is configured to detect the drive letter identifier, acquire the driver value in response to detecting the disk identifier, determine whether the device name associated with the drive letter value is allocated to a different disk, and define the device name of the disk based on the drive letter value so as to insert the disk if the device name is not allocated to the different disk.

According to the method, apparatus and system for inserting a disk as provided in the present disclosure, a server is used for: acquiring a universally unique identifier of a to-be-inserted disk; querying a correspondence between the universally unique identifier of the disk and a device name, wherein the correspondence between the universally unique identifier of the disk and an allocated device name is established when a device name is first allocated to each disk; acquiring the device name of the disk in response to successful querying the correspondence between the universally unique identifier of the disk and the allocated device name; analyzing the device name of the disk to generate a drive letter value of the disk, and generating a drive letter identifier for the disk. Subsequently, a terminal is used for: detecting the drive letter identifier; acquiring the driver value in response to detecting the disk identifier; determining whether the device name associated with the drive letter value is allocated to a different disk; and defining the device name of the disk based on the drive letter value so as to insert the disk if the device name is not allocated to the different disk. As a disk identifier is introduced, a device name of a disk is determined according to the disk identifier and a drive letter value so as to ensure that a device name as generated at the time of creation is used for each disk, thereby effectively avoiding drive letter drift.

BRIEF DESCRIPTION OF THE DRAWINGS

Other features, objects, and advantages of the present disclosure will become more apparent by reading the detailed description about the non-limiting embodiments with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
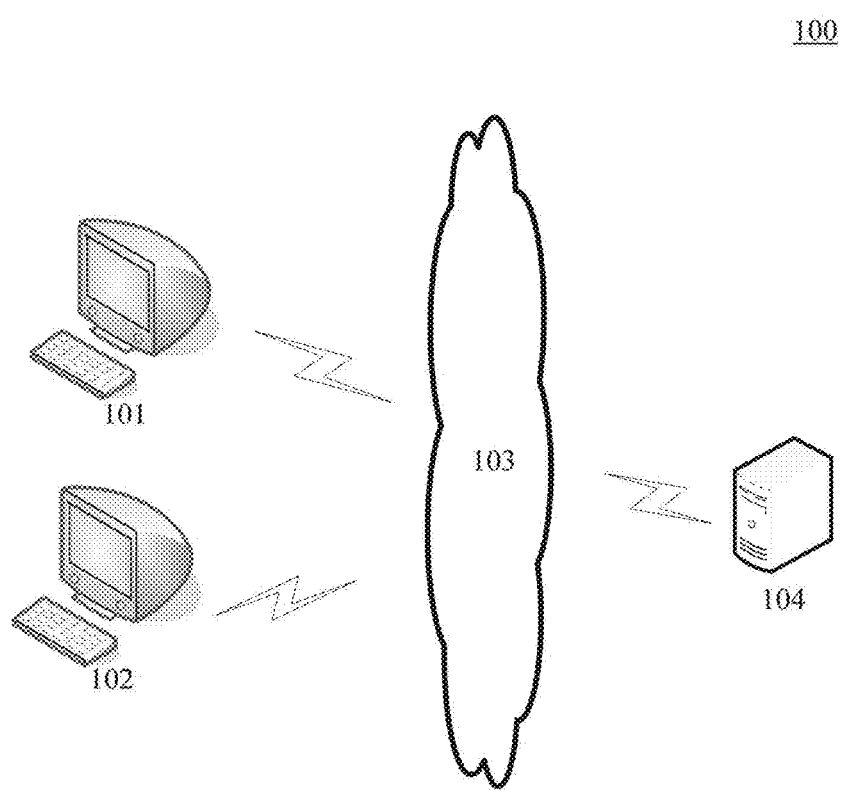
FIG. 1 is an exemplary system architecture to which the embodiments of the present disclosure may be applied.

FIG. 1 shows an exemplary architecture of a system 100 which may be used by the embodiments of the present application.

As shown in FIG. 1, the system architecture 100 may include terminal devices 101 and 102, and a server 104. The network 103 serves as a medium providing a communication link between the terminal devices 101 and 102 and the server 104. The network 103 may include various types of connections, such as wired or wireless transmission links, or optical fibers.

The terminal devices 101 and 102 may interact with the server 104 through the network 103, in order to transmit or receive messages, etc. A virtual machine and various communication client applications, such as antivirus applications, search applications, social platform applications, mailbox clients, and instant messaging tools may be installed on the terminal devices 101 and 102.

In the method for inserting a disk according to the present disclosure, terminals 101, 102 may be various electronic devices that support the installation of virtual machines thereon, the electronic device including but not limited to at least one of the following: physical machine, desktop computer, laptop portable computer, tablet and smart phone.

The virtual machines installed or running on the terminals 101, 102 may interact with a server 104 to receive or send a message. The virtual machines installed or running on the terminals 101, 102 may create or insert at least one disk respectively. At least one operating system (such as Linux operating system, Windows operating system) may be installed on each virtual machine. The operating system installed on the virtual machine may have a kernel (which may be used to manage the operating system's processes, memory, device driver, files and network systems) that may process the created or inserted disk with a front driver module virtio-blk.

The servers 104 may be a variety of servers that provide virtualization management. For example, the server 104 may be a server that provides management service for the virtual machines running on the terminals 101, 102 and the disks created or inserted on the virtual machines. For example, the cloud computing management platform OpenStack may include a virtualization management module Nova or Cinder for managing the network and storage.

In particular, a virtual machine may also run on the server 104, at which point, the exemplary architecture 100 may also include the server 104 only.

It should be noted that the method for inserting a disk as provided in the embodiments of the present disclosure may be performed by the terminals 101, 102 on which virtual machines are running or by the server 104. Correspondingly, the apparatus for inserting a disk as provided in the embodiments of the present disclosure may be provided in the virtual machine running on the terminals 101, 102 or the server 104. The system for inserting a disk as provided in the embodiments of the present disclosure may include the server 104 and terminals 101, 102.

It should be understood that the number of terminals and servers in FIG. 1 is merely illustrative. Depending on the implementation, there may be any number of terminals and servers.

Figure 2:
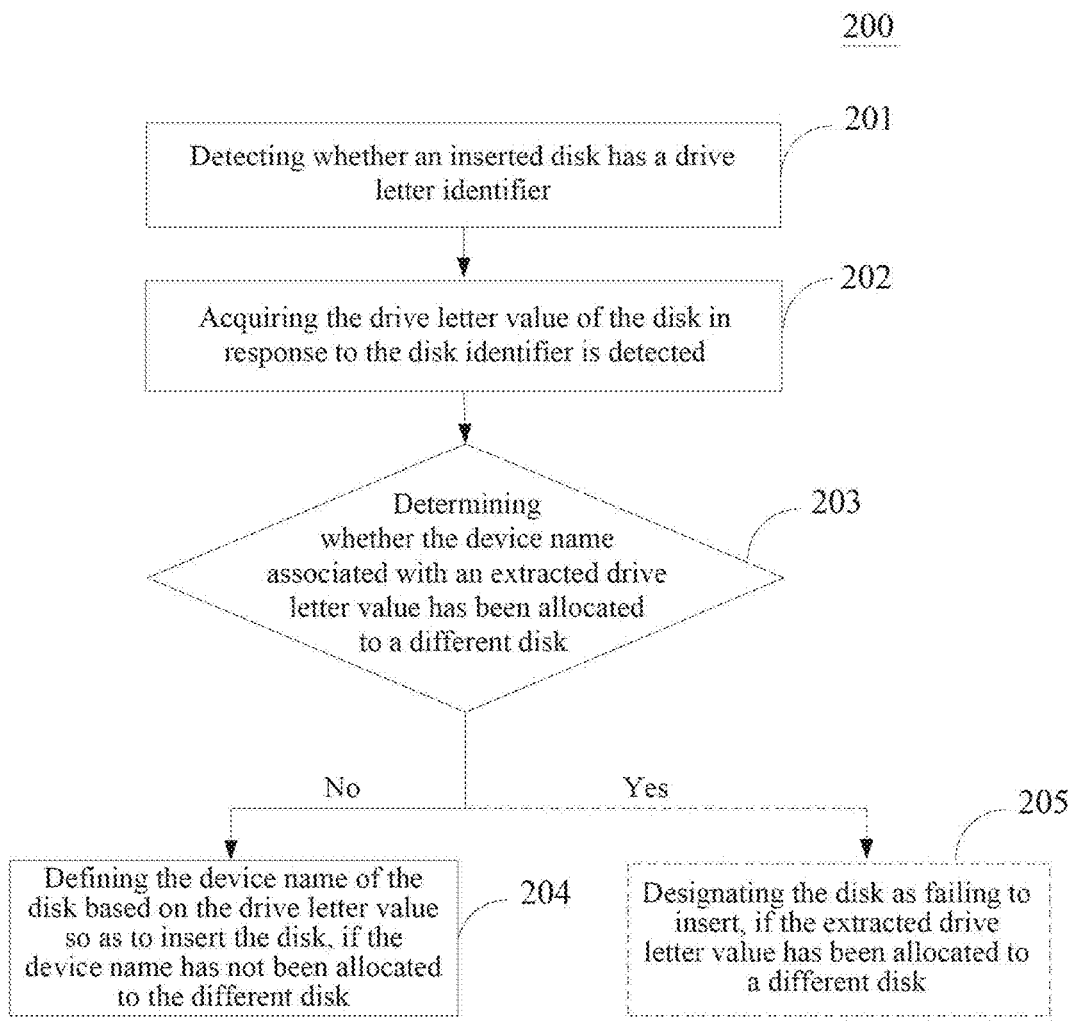
FIG. 2 is a flow chart of an embodiment of a method for inserting a disk according to the present disclosure.

FIG. 2 shows a process 200 of one embodiment of a method for inserting a disk. The present embodiment is mainly exemplified by applying the method to a terminal (for example, terminals 101, 102 in FIG. 1) capable of running a virtual machine. The method for inserting a disk comprises the following steps:

Step 201: detecting whether a to-be-inserted disk has a drive letter identifier.

In the present embodiment, when a disk is inserted into a virtual machine running on a terminal, the virtual machine running on the terminal may detect the inserted disk to determine whether the disk has a drive letter identifier. The virtual machine may define a device name for the disk based on the result of detecting the drive letter identifier of the to-be-inserted disk. Here, the drive letter identifier may be obtained by the server through: acquiring a universally unique identifier of the disk; querying a correspondence between the universally unique identifier of the disk and a device name to obtain a device name of the to-be-inserted disk. The correspondence between the universally unique identifier of the disk and an allocated device name is established when a device name is first allocated to each disk; analyzing the device name of the disk to generate a drive letter value of the disk in response to successful querying the correspondence between the universally unique identifier of the to-be-inserted disk and the allocated device name, and generating a drive letter identifier for the disk.

The drive letter identifier herein may be used to indicate whether a device name is allocated to the disk. The drive letter identifier may be represented by letters or numbers. The electronic device may detect the drive letter identifier to determine whether the to-be-inserted disk has a drive letter identifier. In some implementations, the drive letter identifier may include a preset value on a pre-specified flag bit. For example, a pre-specified flag bit is set, and the value thereof is the preset value of 1. At this point, the detection of the electronic device on a to-be-inserted disk may be as follows: reading a value of the pre-specified flag bit, and determining whether the value is the preset value (1, for example); if yes, defining that the to-be-inserted disk has a drive letter identifier, if no, defining that the to-be-inserted disk does not have a drive letter identifier.

Here, when a to-be-inserted disk is inserted into the virtual machine, the virtual machine may send a universally unique identifier (UUID) of the to-be-inserted disk to the server through a terminal capable of running the virtual machine, so that the server queries a correspondence between the universally unique identifier of the disk and a device name according to the UUID of the to-be-inserted disk. The correspondence between the universally unique identifier of the disk and a device name herein may be stored on the server in the form of list or table, for example, a list of UUIDs and device names that is stored in a Nova module or a Cinder module. Further, the server may query the correspondence between the universally unique identifier of the disk and a device name according to the UUID of the to-be-inserted disk. If the correspondence between the universally unique identifier of the to-be-inserted disk and an allocated device name is queried, the server acquires a device name of the to-be-inserted disk. For example, the server may call a SERIAL field of an encapsulating function library libvirt supporting a mainstream virtualization tool under Linux to acquire the device name, and transmit the name to an emulator QEMU. The server may then analyze the acquired device name to generate a drive letter value of the disk, generate a drive letter identifier for the disk and send it to the virtual machine. For example, the emulator QEMU may exchange disk information with the virtual machine's front driver module virtio-blk through an interaction module (such as the structure struct virtio_blk_config) as provided by the virtual machine for the to-be-inserted disk, the emulator QEMU may set a driver identifier through the interaction module, and send the disk's drive letter value obtained by calculating the device name to the virtual machine through the interaction module. In some implementations, the server may set a pre-specified flag bit in the interaction module (for example, the bit value is modified into 1) so as to generate a drive letter identifier, and transmit the drive letter value to a preset field of the interaction module.

In the present embodiment, the drive letter value may be a value associated with the device name of the disk or a value for transmitting and identifying the device name. The drive letter value may be calculated by a variety of preset rules, so that the drive letter value of each disk corresponds to the device name allocated by the server. In some implementations, the device name may be named using 26 English letters, such as vda, vdb . . . vdz, vdaa, vdab. The server may count the device names in hexadecimal numbers as the drive letter value according to the serial number in the device name sequence. For example, if the device name is vda, the corresponding drive letter value is 0; and if the device name is vdaa, the drive letter value is 1b. Optionally, the drive letter value may be represented by a 8-bit binary number of the preset field, the first device name vda corresponds to the drive letter value 00000000, and the device name vdaa corresponds to the drive letter value 00011011.

Step 202: acquiring a drive letter value of the disk in response to detecting the disk identifier.

In the present embodiment, when the virtual machine running on the terminal detects that the to-be-inserted disk has a drive letter identifier, the virtual machine may acquire the drive letter value of the to-be-inserted disk.

For example, the drive letter value may be calculated by the server and transmitted into a preset field of the interaction module as provided by the virtual machine for the to-be-inserted disk. Optionally, the drive letter value may represent the device name with an 8-bit binary number through an 8-bit preset field. If the device name vdz is the 26th device name, the drive letter value of the preset field may be 00011001. When the virtual machine running on the terminal detects that the to-be-inserted disk has a drive letter identifier, the virtual machine may read a drive letter value of the to-be-inserted disk from the preset field.

Step 203: determining whether the device name associated with the drive letter value is allocated to a different disk.

In the present embodiment, the virtual machine running on the terminal may acquire the device name associated with the drive letter value based on an extracted drive letter value. Further, the virtual machine may determine whether the device name associated with the drive letter value is allocated to a different disk.

In practice, the virtual machine to which the disk belongs may store an allocation status of the device name in advance. The virtual machine may record the allocated device name only, or record the occupation status of all possible device names by means of list. The virtual machine may also map the possible device names to the allocation bit map for device name according to certain rules, so that each bit in the allocation bit map corresponds to a device name. In addition, the virtual machine determines whether the corresponding device name is allocated according to the value on each bit. For example, the value on the bit corresponding to the allocated device name may be modified into the preset value (1, for instance). For example, when the virtual machine QEMU-KVM, if used, allocates device names vda, vdb . . . vdz, vdaa, vdab . . . to the disks in the disk insertion order, the virtual machine may pre-map a device name to each bit in the allocation bit map in such order.

When a virtual machine only records the allocated device name, or records the occupation status of all possible device names using a list, the virtual machine may analyze the drive letter value to get the device name of the to-be-inserted disk, and query to determine whether the device name of the to-be-inserted disk is allocated to a different disk. When the virtual machine records the occupancy status of device name by means of the allocation bit map, the virtual machine may determine the value on the bit corresponding to the device name associated with the to-be-inserted disk in the allocation bit map. Specifically, if the value is a preset value, the virtual machine defines that the device name associated with the to-be-inserted disk is allocated to a different disk, otherwise, defines that the device name associated with the to-be-inserted disk not allocated to the different disk.

Step 204: defining the device name of the disk based on the drive letter value so as to insert the disk if the device name is not allocated to the different disk.

In the present embodiment, if the device name associated with the to-be-inserted disk is not allocated to the different disk, the virtual machine (running on the terminal) into which the disk is inserted may define the device name of the disk according to an extracted drive letter value so as to insert the disk.

In some implementations of the present embodiment, the process 200 may also include a step 205 that the virtual machine may designate the disk as failed to insert if an extracted drive letter value has been allocated to a different disk. Using this approach, the renewed drive letter drift caused by the fact that the inserted disk occupies the device name of a different disk may be effectively avoided.

In some alternative implementations of the present embodiment, the virtual machine may record an occupation status of a device name associated with a respective drive letter value through an allocation bit map, and map the device name associated with the possible drive letter value to the allocation bit map according to certain rules, so that each bit in the allocation bit map corresponds to a device name. When the device name is allocated, a value of the corresponding bit in the allocation bit map is modified to the preset value (1, for example). The virtual machine may sequentially detect the bits behind the bit corresponding to the device name associated with an extracted drive letter value in the allocation bit map. When a first bit having a value not set as the preset value is detected, the device name corresponding to the bit is allocated to the disk.

In some alternative implementations of the present embodiment, the method for inserting a disk according to the present disclosure may further comprise: defining the device name of the disk based on an unoccupied device name in response to not detecting the drive letter identifier. For example, the virtual machine may randomly allocate an unoccupied device name as the device name of the disk, or use a device name specified by a user as the device name of the disk, or use a first unoccupied device name as the device name of the disk in an ranking order of unoccupied device names, which is not limited in the present disclosure. Through this step, the method for inserting a disk according to the present embodiment may be compatible with the disk inserting method for the virtual machine in the prior art, in which the drive letter value is not set.

Figure 3:
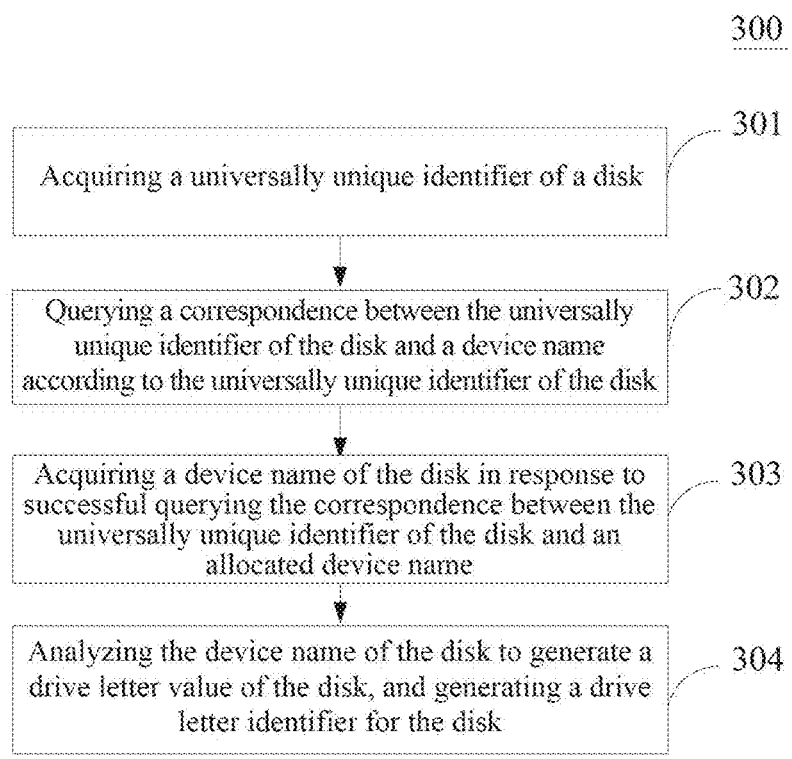
FIG. 3 is a flow chart of another embodiment of a method for inserting a disk according to the present disclosure.

FIG. 3 shows a process 300 of one embodiment of a method for inserting a disk according to the present disclosure. The present embodiment is exemplified by applying a process 300 to a server (for example, the server 104 as shown in FIG. 1) for managing the virtual machine. Specifically, the process 300 comprises:

Step 301: acquiring a universally unique identifier of a to-be-inserted disk;

In the present embodiment, when a disk is inserted into a virtual machine, the server may firstly acquire a universally unique identifier (UUID) of a disk locally or remotely. Specifically, if a virtual machine into which the to-be-inserted disk is inserted is running on the server, the server may acquire the UUID of the disk locally; if a virtual machine into which the to-be-inserted disk is inserted is running on a different terminal (physical machine, for example) that is connected to the server in a wired or wireless manner, the server may acquire the UUID of the disk remotely.

Step 302: querying a correspondence between the universally unique identifier of the disk and a device name according to the universally unique identifier of the disk.

In the present embodiment, the server may save the disks to which device names have been allocated and correspondence between the UUIDs thereof and the allocated device names. When a disk is inserted into the virtual machine, the server may, depending on the UUID of the to-be-inserted disk, query a correspondence between the UUID of disk and a device name so as to determine whether a device name has been allocated to the to-be-inserted disk. Wherein, a correspondence between the UUID of disk and an allocated device name is established when each device name is first allocated to the disk.

In practice, the correspondence between the UUID of disk and device name may be represented by a list, table, etc. For example, when a virtual machine QEMU-KVM is created, the server may allocate a device name to the disk through a Nova module or a Cinder module. The correspondence between the UUID of disk and the device name may be represented by the list of UUIDs and device names as stored in the Nova module or the Cinder module.

In some alternative implementations of the present embodiment, the server may allocate a device name to a disk when the disk is first inserted. The server may accept the device name of disk that is assigned by a user. At this point, the server may firstly detect whether a device name is assigned to the disk. If yes, the assigned device name is allocated to the disk, otherwise, a first unallocated device name may be allocated to the disk according to the allocated device name in the correspondence between the UUID of disk and device name in a naming order of device names (for example, vda, vdb). The server may allocate a device name to each disk again and save the correspondence between the UUID of disk and the allocated device name in the correspondence between the UUID of disk and device name.

Step 303: acquiring the device name of the disk in response to successful querying the correspondence between the universally unique identifier of the disk and the allocated device name.

In the present embodiment, the server queries the correspondence between the UUID of the disk and an allocated device name, which indicates that the server has allocated the device name to the disk. In such case, the server may directly define the device name of the disk according to the correspondence between the UUID of disk and device name. For example, the server may call a SERIAL field of an encapsulating function library libvirt supporting a mainstream virtualization tool under linux to acquire the device name, and transmit the name to an emulator QEMU.

In some alternative implementations of the present embodiment, if the server fails to query the correspondence between the UUID of the disk and an allocated device name, no device name is allocated to the disk. At this point, the server may allocate a device name to the disk according to the above-mentioned method used by the server to allocate device name to the disk when it is first inserted.

Step 304: analyzing the device name of the disk to generate the drive letter value of the disk, and generating a drive letter identifier for the disk.

In the present embodiment, the server may analyze the acquired device name of the disk to generate a drive letter value of the disk, and generate a drive letter identifier for the disk. Wherein, the drive letter identifier may be used to indicate whether a device name is allocated to the disk, and may be represented by letters or numbers. Optionally, the drive letter identifier may include a preset value on a pre-specified flag bit, such as a preset value of 1.

The drive letter value may be a value associated with the device name of the disk or a value for transmitting and identifying the device name. The drive letter value may be calculated by a variety of preset rules, so that the drive letter value of each disk corresponds to the device name allocated by the server. In some implementations, the device name is named according to 26 English letters, such as vda, vdb vdz, vdaa, vdab. The server may count the device names in hexadecimal numbers as the drive letter value according to the serial number in the device name sequence. For example, if the device name is vda, the corresponding drive letter value is 0; and if the device name is vdaa, the drive letter value is 1b. Optionally, the drive letter value may be represented by a 8-bit binary number of the preset field, the first device name vda corresponds to the drive letter value 00000000, and the device name vdaa corresponds to the drive letter value 00011011.

The server may also generate a drive letter identifier for the disk, and generate the drive letter value. The drive letter identifier may be represented, for example, by the preset value on a preset flag bit.

As an example, the server may use an emulator QEMU to exchange information with the virtual machine's front driver module virtio-blk through an interaction module (such as a structure struct virtio_blk_config) as provided by the virtual machine for the disk to which a device name is allocated. The server may send the drive letter value to a preset unused field in the interaction module, and set a preset flag bit (its value is modified into the preset value of 1) in the interaction module so as to set a drive letter identifier for the disk to which a device name is allocated.

Figure 4:
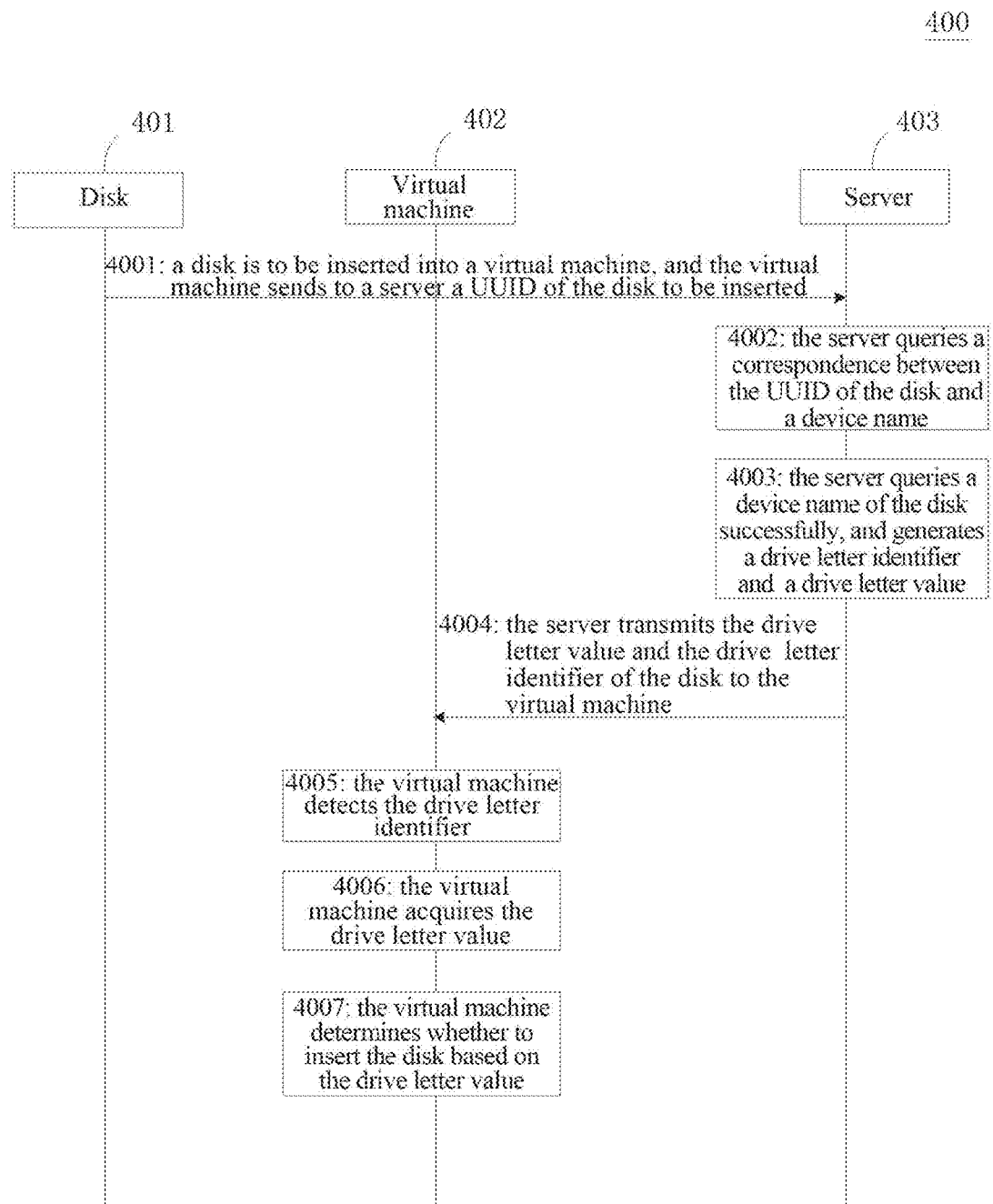
FIG. 4 is a schematic diagram of an application scenario of a method for inserting a disk according to the present disclosure.

Referring to FIG. 4 and combining the embodiments as shown in FIG. 2 and FIG. 3, it is described with the allocation of the device name to the disk when the method for inserting a disk according to the present disclosure is applied to a virtual machine QEMU-KVM and the insertion of a disk when the virtual machine processes a to-be-inserted disk as the application scenarios. The application scenario as shown in FIG. 4 includes a process 400 that involves a disk 401, a virtual machine 402, and a server 403, wherein the virtual machine 402 may run on the server 403 or may run on a different terminal that is connected to the server 403 in a wired or wireless manner. In the process of inserting the disk 401 into the virtual machine 402 in the application scenario, the virtual machine 402 (which may include a virtual machine kernel Guest Kernel and a front driver module virtio-blk) executes the method for inserting a disk ad shown in FIG. 2, and the server 403 (for example, it may include a virtualization management module Nova or Cinder and an emulator QEMU) executes the method for inserting a disk as shown in FIG. 3. specifically.

In step 4001, a disk 401 is to be inserted into a virtual machine 402, and the virtual machine 402 may acquire a UUID of the disk 401 and send it to a server 403;

In step 4002, the server 403 may acquire the UUID of the disk 401 and query a correspondence between the UUID of disk and a device name as stored therein (for example, it is stored through the virtualization management module Nova or Cinder as installed on the server 403) so as to determine whether a disk name is allocated to the disk 401. Wherein, a correspondence between the UUID of each disk and an allocated device name is established when a device name is first allocated to the disk and is saved by the server 403;

In step 4003, the server 403 queries the device name of the disk 401, further acquires the device name of the disk 401 and acquires the device name through a SERIAL field of an encapsulating function library libvirt of a virtualization tool and transmits it to an emulator QEMU. The emulator QEMU may analyze the device name of the disk 401, generate a drive letter value of the disk 401, and generate a drive letter identifier for the disk 401.

In step 4004, the emulator QEMU in the server 403 may send the drive letter value and the drive letter identifier of the disk 401 to the virtual machine 402 through an interaction module (such as a structure struct virtio_blk_config) as provided by the virtual machine 402 for the disk to which a device name is allocated.

In step 4005, the virtual machine 402 may detect the interaction module through a front driver module virtio-blk so as to determine whether the disk 401 has a drive letter identifier;

In step 4006, in response to detecting the identifier of the disk 401, the virtual machine 402 may acquire the drive letter value of the disk 401 from the interaction module (such as the structure struct virtio_blk_config).

In step 4007, the virtual machine 402 may determine whether the device name associated with an extracted drive letter value is allocated to a different disk. If the device name is not allocated to the different disk, the virtual machine 402 may define that the device name associated with the drive letter value is the device name of the disk 401, and insert the disk 401. Optionally, if the device name associated with the drive letter value of the disk 401 is allocated to a different disk, the virtual machine 402 may designate the disk 401 as failed to insert or rejected to insert.

For the method for inserting a disk according to the present disclosure, as a disk identifier is introduced, a device name of a disk is defined according to the disk identifier and a drive letter value so as to ensure that a device name as generated at the time of creation is used for each disk, thereby effectively avoiding drive letter drift.

Figure 5:
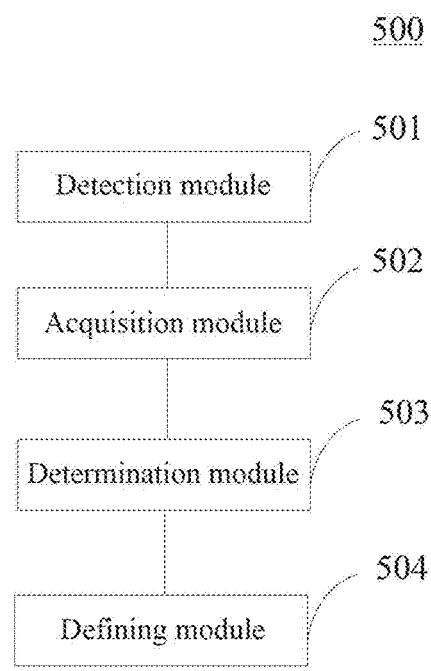
FIG. 5 is a structural diagram of an embodiment of an apparatus for inserting a disk according to the present disclosure.

Further referring to FIG. 5, as an implementation of the method as shown in FIG. 2, the present disclosure provides an embodiment of an apparatus for inserting a disk, and the embodiment of the apparatus corresponds to that of the method as shown in FIG. 2. An apparatus 500 may be adapted to any terminal capable of running a virtual machine, such as a physical machine. It will be understood that at least one virtual machine may be running on a terminal, and each virtual machine may include one of the apparatus 500.

As shown in FIG. 5, a terminal 500 for inserting a disk in the present embodiment comprises a detection module 501, an acquisition module 502, a determination module 503 and a defining module 504. Wherein, the detection module 501 may be configured to: detect whether a to-be-inserted disk has a drive letter identifier, wherein the drive letter identifier is acquired by a server through: acquiring a universally unique identifier of the disk; querying a correspondence between the universally unique identifier of the disk and a device name, wherein the correspondence between the universally unique identifier of the disk and an allocated device name is established when a device name is first allocated to each disk; acquiring the device name of the disk in response to successful querying the correspondence between the universally unique identifier of the disk and the allocated device name; and analyzing the device name of the disk to generate a drive letter value of the disk, and generating a drive letter identifier for the disk. The acquisition module 502 may be configured to acquire the drive letter value in response to detecting the disk identifier. The determination module 503 may be configured to determine whether the device name associated with the drive letter value is allocated to a different disk. The defining module 504 may be configured to define the device name of the disk based on the drive letter value so as to insert the disk if the device name is not allocated to the different disk.

In some alternative implementations of the present embodiment, the apparatus 500 also comprises a compatible module (not shown), configured to define the device name of the disk based on an unoccupied device name so as to insert the disk in response to not detecting the drive letter identifier.

In some alternative implementations of the present embodiment, the compatible module comprises a detection unit, configured to sequentially detect whether a value on each bit in an allocation bit map is a preset value, wherein the allocation bit map is used to record an occupancy status of a device name associated with each drive letter value at a present time, and a value on a bit corresponding to an occupied drive letter value of an associated device name is set as the preset value; and a defining unit, configured to define the device name, associated with the detected drive letter value corresponding to a first bit having a value not set as the preset value, as the device name of the disk so as to insert the disk.

In some alternative implementations of the present embodiment, the drive letter identifier comprises a preset value on a predetermined flag bit.

In some alternative implementations of the present embodiment, the determination module is further configured to: determine whether a value on a bit corresponding to the drive letter value in an allocation bit map for device name is a preset value, wherein the allocation bit map is used to record an occupancy status of the device name associated with each drive letter value at a present time, and a value on a bit corresponding to the occupied drive letter value of the associated device name is set as the preset value; if yes, determining that the device name associated with the drive letter value is allocated to a different disk; if no, determining that the device name associated with the drive letter value is not allocated to the different disk.

In some embodiments, the terminal 500 also comprises an error reporting module, configured to designate the disk as failed to insert if an extracted drive letter value has been allocated to a different disk.

It is worth noting that the modules as recorded in the apparatus 500 correspond to the steps in the method as described in FIG. 2. Therefore, the operations and features described for the method are equally applicable to the apparatus 500 for inserting a disk and the modules or units contained therein, and will not be described again.

Those skilled in the art may understand that the apparatus 500 also comprises some other well known structures such as processor, memory. In order to obscure the embodiments of the present disclosure unnecessarily, such well known structures are not shown in FIG. 5.

Figure 6:
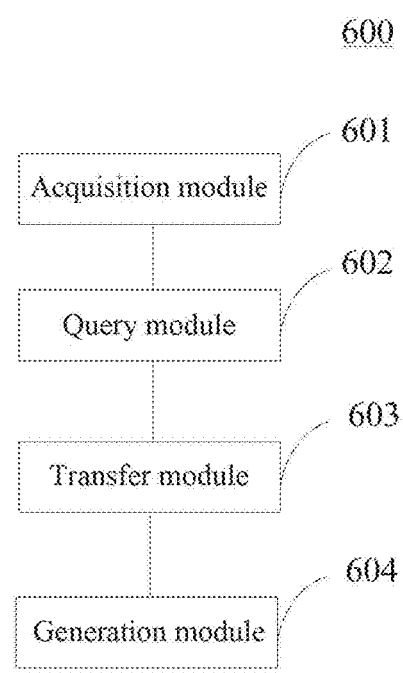
FIG. 6 is a structural diagram of another embodiment of an apparatus for inserting a disk according to the present disclosure.

Referring further to FIG. 6, the present disclosure provides an embodiment of a different apparatus for inserting a disk as an implementation of the method as shown in FIG. 3. The embodiments of the apparatus correspond to that of the method as shown in FIG. 3. The apparatus 600 may be suitable for any server for managing virtual machines.

As shown in FIG. 6, the apparatus 600 for inserting a disk according to the present embodiment comprises an acquisition module 601, a query module 602, a transfer module 603 and a generation module 604. Wherein, the acquisition module 601 may be configured to acquire a universally unique identifier of a to-be-inserted disk; the query module 602 may be configured to query a correspondence between the universally unique identifier of the disk and a device name according to the universally unique identifier of the disk, wherein the correspondence between the universally unique identifier of the disk and an allocated device name is established when a device name is first allocated to each disk; the transfer module 603 may be configured to acquire the device name of the disk in response to successful querying the correspondence between the universally unique identifier of the disk and the allocated device name; and the generation module 604 may be configured to analyze the device name of the disk to generate a drive letter value of the disk, and generating a drive letter identifier for the disk, so that a virtual machine detects the drive letter identifier, acquires the driver value in response to detecting the disk identifier, determines whether the device name associated with the drive letter value is allocated to a different disk, and defines the device name of the disk based on the drive letter value so as to insert the disk if the device name is not allocated to the different disk.

In some alternative implementations of the present embodiment, the apparatus 600 also comprises a detection module (not shown) that includes: a detection unit, configured to detect whether the device name is assigned to the disk; and an allocation unit, configured to allocate the assigned device name to the disk if the device name is assigned to the disk, if no, allocating a first unallocated device name to the disk in a naming order of device names.

It is worth noting that the modules as recorded in the apparatus 600 for inserting a disk correspond to the steps in the method as described in FIG. 3. Therefore, the operations and features described for the method are equally applicable to the apparatus 600 for inserting a disk and the modules or units contained therein, and will not be described again.

Those skilled in the art may understand that the apparatus 600 for inserting a disk also comprises some other well known structures such as processor, memory. In order to obscure the embodiments of the present disclosure unnecessarily, such well known structures are not shown in FIG. 6.

In addition, the present disclosure also provides a system for inserting a disk, the system comprising a server for managing a virtual machine and a terminal capable of running the virtual machine. Specifically, the server is configured to: acquire a universally unique identifier of a to-be-inserted disk; querying a correspondence between a universally unique identifier of the disk and a device name according to the universally unique identifier of the disk, wherein the correspondence between the universally unique identifier of the disk and an allocated device name is established when a device name is first allocated to each disk; acquiring the device name of the disk in response to successful querying the correspondence between the universally unique identifier of the disk and the allocated device name; and analyzing the device name of the disk to generate a drive letter value of the disk, and generating a drive letter identifier for the disk. The virtual machine running on the terminal is configured to: detect the drive letter identifier; acquiring the driver value in response to detecting the disk identifier; determining whether the device name associated with the drive letter value is allocated to a different disk; and defining the device name of the disk based on the drive letter value so as to insert the disk if the device name is not allocated to the different disk.

It may be understood that the apparatus 600 may be provided in a server for managing a virtual machine in the system for inserting a disk, and the apparatus 500 may be provided in a virtual machine running on the terminal, which will not be described again.

The units involved in the embodiments of the present disclosure may be implemented by software, or may be implemented by hardware. The described modules may also be provided in a processor. For example, it may be descried as follows: a processor comprises a detection module, an acquisition module, a determination module and a defining module. The names of these modules do not in any case constitute a limitation to the modules themselves. For example, the detection module may also be described as "a module configured to detect whether a to-be-inserted disk has a drive letter identifier".

As another aspect, the present disclosure also provides a computer-readable storage medium which may be a computer-readable storage medium contained in the apparatus according to the embodiments above, or an independent computer-readable storage medium that is not assembled into the terminal. The computer-readable storage medium stores one or more programs. The execution of the one or more programs by one or more processors enables the apparatus to: detect whether a to-be-inserted disk has a drive letter identifier, wherein the drive letter identifier is acquired by a server through: acquiring a universally unique identifier of the disk, querying a correspondence between the universally unique identifier of the disk and a device name, the correspondence between the universally unique identifier of the disk and an allocated device name being established when a device name is first allocated to each disk, acquiring the device name of the disk in response to successful querying the correspondence between the universally unique identifier of the disk and the allocated device name, and analyzing the device name of the disk to generate a drive letter value of the disk, and generating a drive letter identifier for the disk; acquire the drive letter value in response to detecting the disk identifier; determine whether the device name associated with the drive letter value is allocated to a different disk; and determine the device name of the disk based on the drive letter value so as to insert the disk if the device name is not allocated to the different disk.

Alternatively, such execution enables the apparatus to: acquire a universally unique identifier of a to-be-inserted disk; query a correspondence between a universally unique identifier of the disk and a device name according to the universally unique identifier of the disk, wherein the correspondence between the universally unique identifier of the disk and an allocated device name is established when a device name is first allocated to each disk; acquire the device name of the disk in response to successful querying the correspondence between the universally unique identifier of the disk and the allocated device name; analyze the device name of the disk to generate a drive letter value of the disk, and generate the drive letter identifier for the disk, so that a virtual machine detects the drive letter identifier, acquires the driver value in response to detecting the disk identifier, determines whether the device name associated with the drive letter value is allocated to a different disk, and defines the device name of the disk based on the drive letter value so as to insert the disk if the device name is not allocated to the different disk.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for inserting a disk, comprising:
detecting whether an inserted disk has a drive letter identifier, wherein the drive letter identifier is acquired by a server through: acquiring a universally unique identifier of the disk; querying a correspondence between the universally unique identifier of the disk and a device name, wherein the correspondence between the universally unique identifier of the disk and an allocated device name is established when a device name is first allocated to each disk; acquiring the device name of the disk in response to successful querying the correspondence between the universally unique identifier of the disk and the allocated device name; and analyzing the device name of the disk to generate a drive letter value of the disk, and generating a drive letter identifier for the disk;
acquiring the drive letter value in response to determining that the drive letter identifier is detected;
determining whether the device name associated with the drive letter value is allocated to a different disk; and
defining the device name of the disk based on the drive letter value so as to insert the disk, if the device name is not allocated to the different disk.

2. The method according to claim 1, further comprising:
defining the device name of the disk based on an unoccupied device name so as to insert the disk, in response to determining that a drive letter identifier is not detected.

3. The method according to claim 2, wherein the defining the device name of the disk based on an unoccupied device name so as to insert the disk comprises:
sequentially detecting whether a value on each bit in an allocation bit map is a preset value, wherein the allocation bit map is configured to record an occupancy status of a device name associated with each drive letter value at a present time, and a value on a bit in the allocation bit map corresponding to an occupied drive letter value of an associated device name is set as the preset value; and
defining the device name, associated with the detected drive letter value corresponding to a first bit having a value not set as the preset value, as the device name of the disk so as to insert the disk.

4. The method according to claim 1, wherein the drive letter identifier comprises a preset value on a predetermined flag bit.

5. The method according to claim 1, wherein the determining whether the device name associated with the drive letter value is allocated to a different disk comprises:
determining whether a value on a bit in an device name allocation bit map corresponding to the drive letter value is a preset value, wherein the allocation bit map is configured to record an occupancy status of the device name associated with each drive letter value at a present time, and a value on a bit in the allocation bit map corresponding to an occupied drive letter value of an associated device name is set as the preset value;
if yes, determining that the device name associated with the drive letter value is allocated to a different disk;
if no, determining that the device name associated with the drive letter value is not allocated to the different disk.

6. The method according to claim 1, further comprising:
designating the disk as failed to insert if an extracted drive letter value has been allocated to a different disk.

7. A method for inserting a disk, comprising:
acquiring a universally unique identifier of an inserted disk;
querying a correspondence between the universally unique identifier of the disk and a device name based on the universally unique identifier of the disk, wherein the correspondence between the universally unique identifier of the disk and an allocated device name is established when a device name is first allocated to each disk;
acquiring the device name of the disk in response to successful querying the correspondence between the universally unique identifier of the disk and the allocated device name;
analyzing the device name of the disk to generate a drive letter value of the disk, and generating a drive letter identifier for the disk, so that a virtual machine detects the drive letter identifier, acquires the driver value in response to determining that the drive letter identifier is detected, determines whether the device name associated with the drive letter value is allocated to a different disk, and defines the device name of the disk based on the drive letter value so as to insert the disk if the device name is not allocated to the different disk.

8. The method according to claim 7, wherein first allocating a device name to each disk comprises:
detecting whether the device name is assigned to the disk to be allocated; and
if yes, allocating the assigned device name to the disk to be allocated, if no, allocating a first unallocated device name to the disk to be allocated in a naming order of device names.

9. An apparatus for inserting a disk, comprising:
at least one processor; and
a memory storing instructions, which when executed by the at least one processor, cause the at least one processor to perform operations, the operations comprising:
detecting whether an inserted disk has a drive letter identifier, wherein the drive letter identifier is acquired by a server through: acquiring a universally unique identifier of the disk; querying a correspondence between the universally unique identifier of the disk and a device name, wherein the correspondence between the universally unique identifier of the disk and an allocated device name is established when a device name is first allocated to each disk; acquiring the device name of the disk in response to successful querying the correspondence between the universally unique identifier of the disk and the allocated device name; and analyzing the device name of the disk to generate a drive letter value of the disk, and generating a drive letter identifier for the disk;
acquiring the drive letter value in response to determining that the drive letter identifier is detected;
determining whether the device name associated with the drive letter value is allocated to a different disk; and
defining the device name of the disk based on the drive letter value so as to insert the disk, if the device name is not allocated to the different disk.

10. The apparatus according to claim 9, wherein the operations further comprises:
defining the device name of the disk based on an unoccupied device name so as to insert the disk, in response to determining that a drive letter identifier is not detected.

11. The apparatus according to claim 10, wherein the defining the device name of the disk based on an unoccupied device name so as to insert the disk comprises:
sequentially detecting whether a value on each bit in an allocation bit map is a preset value, wherein the allocation bit map is configured to record an occupancy status of a device name associated with each drive letter value at a present time, and a value on a bit in the allocation bit map corresponding to an occupied drive letter value of an associated device name is set as the preset value; and
defining the device name, associated with the detected drive letter value corresponding to a first bit having a value not set as the preset value, as the device name of the disk so as to insert the disk.

12. The apparatus according to claim 9, wherein the drive letter identifier comprises a preset value on a predetermined flag bit.

13. The apparatus according to claim 9, wherein the determining whether the device name associated with the drive letter value is allocated to a different disk comprises:
determining whether a value on a bit in an device name allocation bit map corresponding to the drive letter value is a preset value, wherein the allocation bit map is configured to record an occupancy status of the device name associated with each drive letter value at a present time, and a value on a bit in the allocation bit map corresponding to an occupied drive letter value of an associated device name is set as the preset value;
if yes, determining that the device name associated with the drive letter value is allocated to a different disk;
if no, determining that the device name associated with the drive letter value is not allocated to the different disk.

14. The apparatus according to claim 9, wherein the operations further comprises:
designating the disk as failed to insert if an extracted drive letter value has been allocated to a different disk.

15. An apparatus for inserting a disk, comprising:
at least one processor; and
a memory storing instructions, which when executed by the at least one processor, cause the at least one processor to perform operations, the operations comprising:
acquiring a universally unique identifier of an inserted disk;
querying a correspondence between the universally unique identifier of the disk and a device name based on the universally unique identifier of the disk, wherein the correspondence between the universally unique identifier of the disk and an allocated device name is established when a device name is first allocated to each disk;
acquiring the device name of the disk in response to successful querying the correspondence between the universally unique identifier of the disk and the allocated device name;
analyzing the device name of the disk to generate a drive letter value of the disk, and generating a drive letter identifier for the disk, so that a virtual machine detects the drive letter identifier, acquires the driver value in response determining that the drive letter identifier is detected, determines whether the device name associated with the drive letter value is allocated to a different disk, and defines the device name of the disk based on the drive letter value so as to insert the disk if the device name is not allocated to the different disk.

16. The apparatus according to claim 15, wherein first allocating a device name to each disk comprises:
- detecting whether the device name is assigned to the disk to be allocated; and
- if yes, allocating the assigned device name to the disk to be allocated, if no, allocating a first unallocated device name to the disk to be allocated in a naming order of device names.

17. A system for inserting a disk, comprising a server for managing a virtual machine and a terminal capable of running the virtual machine, wherein:
- the server is configured to: acquire a universally unique identifier of an inserted disk; query a correspondence between the universally unique identifier of the disk and a device name based on the universally unique identifier of the disk, wherein the correspondence between the universally unique identifier of the disk and an allocated device name is established when a device name is first allocated to each disk; acquire the device name of the disk in response to successful querying the correspondence between the universally unique identifier of the disk and the allocated device name; and analyze the device name of the disk to generate a drive letter value of the disk, and generate a drive letter identifier for the disk;
- the virtual machine running on the terminal is configured to: detect the drive letter identifier; acquire the driver value in response to determining that the drive letter identifier is detected; determine whether the device name associated with the drive letter value is allocated to a different disk; and define the device name of the disk based on the drive letter value so as to insert the disk if the device name is not allocated to the different disk.

* * * * *